(12) United States Patent
Masui et al.

(10) Patent No.: US 8,301,908 B2
(45) Date of Patent: Oct. 30, 2012

(54) DATA SECURITY IN AN INFORMATION PROCESSING DEVICE

(75) Inventors: Takanori Masui, Ebina (JP); Tatsuhiko Yokohama, Ebina (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 68 days.

(21) Appl. No.: 12/718,793

(22) Filed: Mar. 5, 2010

(65) Prior Publication Data
US 2010/0162000 A1 Jun. 24, 2010

Related U.S. Application Data

(63) Continuation of application No. 10/653,216, filed on Sep. 3, 2003, now abandoned.

(30) Foreign Application Priority Data

Mar. 24, 2003 (JP) .................................. 2003-081558

(51) Int. Cl.
*G06F 12/14* (2006.01)
(52) U.S. Cl. .......................................... 713/189; 380/44
(58) Field of Classification Search .......................... None
See application file for complete search history.

(56) References Cited

U.S. PATENT DOCUMENTS

| | | | |
|---|---|---|---|
| 5,442,616 A | 8/1995 | Ogata et al. | |
| 5,457,748 A * | 10/1995 | Bergum et al. | 380/270 |
| 5,677,952 A | 10/1997 | Blakley | |
| 5,805,706 A | 9/1998 | Davis | |
| 6,567,914 B1 | 5/2003 | Just et al. | |
| 6,658,566 B1 | 12/2003 | Hazard | |
| 6,862,583 B1 * | 3/2005 | Mazzagatte et al. | 705/64 |
| 6,947,560 B1 * | 9/2005 | Smeets et al. | 380/44 |
| 6,993,130 B1 | 1/2006 | Fernandez et al. | |
| 6,996,238 B2 | 2/2006 | Candelore | |
| 7,093,295 B1 * | 8/2006 | Saito | 726/26 |
| 7,180,909 B1 | 2/2007 | Achler | |
| 7,225,339 B2 * | 5/2007 | Asano et al. | 713/193 |
| 7,284,061 B2 * | 10/2007 | Matsubayashi et al. | 709/229 |
| 7,590,860 B2 * | 9/2009 | Leporini et al. | 713/185 |
| 2002/0133543 A1 | 9/2002 | Fujiwara | |
| 2002/0174351 A1 | 11/2002 | Jeong et al. | |

(Continued)

FOREIGN PATENT DOCUMENTS

CN A 1222274 7/1999

(Continued)

OTHER PUBLICATIONS

Sep. 14, 2010 Office Action issued in Japanese Patent Application No. 2003-081558 (with translation).

*Primary Examiner* — Shewaye Gelagay
(74) *Attorney, Agent, or Firm* — Oliff & Berridge, PLC (57) ABSTRACT

A device and method for data protection of inputted and stored publicly encrypted data. Publicly encrypted data can be received by a data receiver module and stored in a storage module and be decrypted by a decryption module using a first encryption key. A deciding device can determine whether or not the data needs protection. If necessary, the data can be re-encrypted by an encryption module based on a second and different internal private encryption key generated from the encryption module and stored in the storage module.

3 Claims, 8 Drawing Sheets

U.S. PATENT DOCUMENTS

| | | |
|---|---|---|
| 2003/0145218 A1 | 7/2003 | Hutchison |
| 2003/0219127 A1 | 11/2003 | Russ et al. |
| 2004/0015687 A1 | 1/2004 | Chiarabini et al. |

FOREIGN PATENT DOCUMENTS

| | | |
|---|---|---|
| CN | A 1222991 | 7/1999 |
| CN | A 1330819 | 1/2002 |
| EP | 1 122 910 A1 | 8/2001 |
| JP | A-8-504067 | 4/1996 |
| JP | A-09-134264 | 5/1997 |
| JP | A-2002-16594 | 1/2002 |
| JP | A-2002-305512 | 10/2002 |
| KR | 2002-0088540 | 11/2002 |
| WO | WO 97/39552 | 10/1997 |
| WO | WO 02/093316 A2 | 11/2002 |

\* cited by examiner

DATA SECURITY IN AN INFORMATION PROCESSING DEVICE

CROSS REFERENCE TO RELATED APPLICATIONS

This is a Continuation of application Ser. No. 10/653,216, filed Sep. 3, 2003, which in turn claims the benefit of Japanese Application No. JP 2003-081558, filed Mar. 24, 2003. The disclosures of the prior applications are hereby incorporated by reference herein in their entirety.

BACKGROUND

1. Field of the Invention

The present invention relates to an information processing device for executing processing in accordance with processing instruction data and processing target data received via a network, and particularly relates to technology for ensuring security of such data.

2. Description of the Related Art

In recent years, demands have been increasing to increase the strength of information security due to the increasing prevalence of networks and the accompanying misuse of information. In response to these demands, fundamental technology referred to as PKI (public key infrastructure) using public key encryption methods has become widespread, with various types of information equipment such as copiers, multi-function equipment, and facsimiles that are PKI-compatible being developed.

PKI-compatible equipment receives processing instruction data and processing target data encrypted using a public key for its own device via a network from external PCs (personal computers) and various devices. In this case, the forms that processing of encrypted data received by PKI-compatible equipment takes can be roughly classified into the following two types.

First, equipment decrypts received encrypted data using a private key of its own equipment and existing processing is executed based on the results of this decryption. Second, equipment decrypts received encrypted data using a private key of its own equipment, holds the results of decryption in an internal storage device (for example, a hard disk), and then reads out the held data and carries out processing afterwards. An example of the second form of processing would be a security print. In security print processing, the printer temporarily internally stores print data sent from an external PC and executes print processing on the saved print data on condition that the user inputs the correct password to the printer.

Further, that disclosed in Japanese Patent Laid-open Publication No. Hei. 09-134264 is known as an image processing device for decrypting and processing received encrypted data.

In this way, with related PKI-compatible equipment, in the above second method there is a possibility that decrypted data will be held for long periods of time in storage devices within the equipment and there is a danger of information being disclosed during this time.

In order to deal with this, the second method has been considered where encrypted data received from external devices is held in storage devices in place of decrypted data in the processing of the above two methods. However, this method causes the following problems to arise.

First, with PKI, reliability is based on public key certificates for public keys certified by a Certificate Authority (CA). Such public key certificates have a period of validity (usually one year) and when this period of validity runs out, it is necessary to create a new separate private key/public key pair and have a public key certificate issued. When data encrypted using the old public key is then held in a storage unit within the equipment, it is necessary to save not just the current private key but also the old private key in order to execute processing on this data. Management of old private keys therefore becomes complex in cases where public key certificates are issued by a number of certifying authorities such as public certifying authorities or private in-house certificate authorities. This problem is more prominent for data stored for short periods such as with print processing for printers and multi-purpose equipment. This is because the amount of data kept over long periods of time in such cases is small but private key history management is still necessary regardless of the amount of data being small.

Second, the encryption strength of encrypted data sent from external devices to the equipment depends on the encryption method used by the external device and on key length. The encryption strength of encrypted data from different external devices may therefore differ. On the other hand, in the management of information within a single enterprise, it is demanded that encryption strength of data held in equipment within the enterprise is of a fixed extent or greater. However, encrypted data received from external devices is managed as is and this condition is therefore not fulfilled.

SUMMARY

An information processing device of the present invention comprises a data input interface for inputting encrypted data, a decryption module for decrypting encrypted data inputted by the data input interface using a decryption key forming a pair with a first encryption key used to encrypt the data, an encryption module for encrypting data decrypted by the decryption module using a second encryption key different from the first encryption key, and storage for storing data encrypted by the encryption module.

In a preferred embodiment of the present invention a key generator is provided for generating a second encryption key used when the encryption module carries out encryption.

In a further preferred embodiment, volatile memory and a memory controller for storing the second encryption key in the volatile memory are provided.

DETAILED DESCRIPTION OF EMBODIMENTS

The following is a description based on the drawings of a preferred embodiment of the present invention. In the following a description is given of an image-forming device such as digital multi-function equipment etc. given as an example of an information processing device of the present invention.

Figure 1:
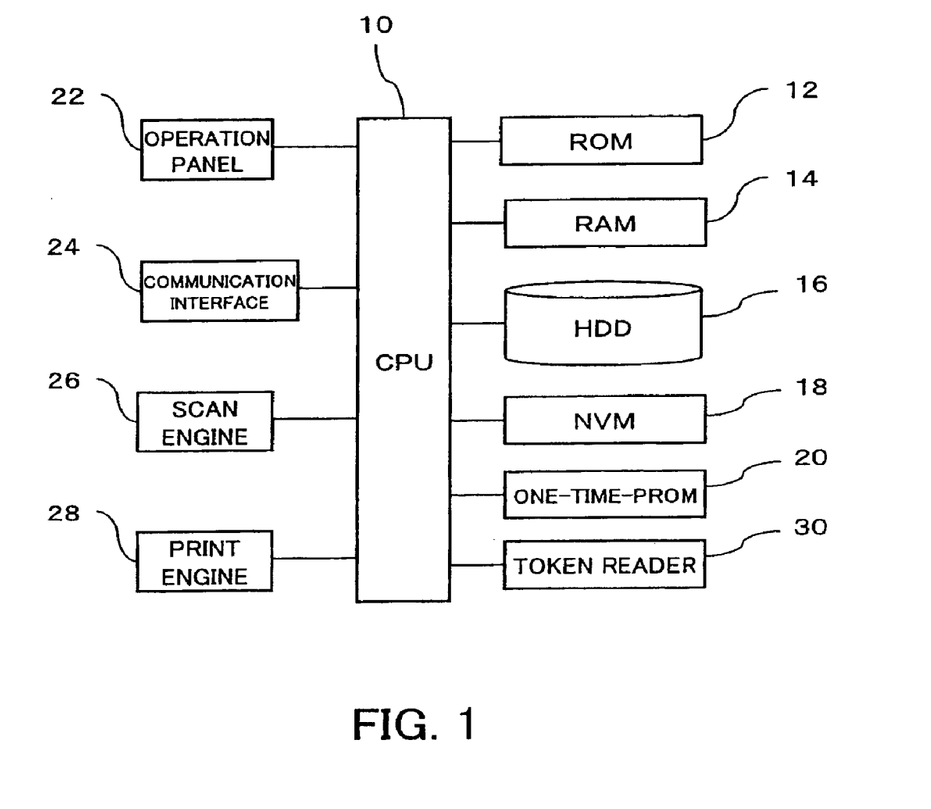
FIG. 1 is a view showing the essential parts of a hardware configuration for an image-forming device of the present invention.

First, referring to FIG. 1, a description is given of a hardware configuration for an image-forming device of this embodiment. FIG. 1 is a view showing structural elements essential to the description of the control of this embodiment, with other structural elements being omitted from the drawing.

This image-forming device is a device such as a digital copier or digital multifunction peripheral that handles images obtained by optically reading an original document as digital data. This image-forming device is equipped with PKI-compatible functions. Namely, the image-forming device has a private key/public key pair corresponding to a public key certificate issued for itself by a certificate authority and is provided with a function for using the private key to decrypt data from external devices encrypted using this public key. Further, the image-forming device is equipped with a function for encrypting data using the public key of external equipment when data is sent to the external equipment.

At this device, digital information such as a control program for controlling operations of the image-forming device is stored in a ROM (Read Only Memory) 12. A CPU (Central Processing Unit) 10 executes control of each part of the image-forming device by implementing the control program within the ROM 12. A PKI-compatible processing function and a data protection function for the saved data (described later) are also stored in the ROM 12 together with the program described above.

A RAM (Random Access Memory) 14 is the main storage device of this image-forming device and is used as work memory when executing the control program. The RAM 14 can be used, for example, as a page buffer for storing a one page portion of image data for supplying to the print engine 28.

A HDD (Hard Disk Drive) 16 is an auxiliary storage device for storing various kinds of data. For example, the image-forming device saves job data that is received or that is generated in the HDD 16. This job data may be, for example, print target document data for a print job requested via a network from a remote host, document image data read by a scan engine 26 for copying, or image data read by a scan engine 26 in accordance with scanning instructions.

Non-Volatile Memory 18 (NVM) is memory for storing various kinds of semi-permanent setting information and programs relating to control of the image-forming device and is constructed from, for example, a battery backup RAM etc. Types of image-forming devices where the HDD 16 is optional are very common. With this kind of equipment the job data is stored in the NVM 18 when a HDD 16 is not provided.

A secret key corresponding to the public key certificate issued for this image-forming device is stored in one of either the HDD 16 or the NVM 18.

A one-time PROM (one-time Programmable Read Only Memory) 20 is non-volatile memory capable of being written to only once. This one-time PROM is recorded with, for example, a unique device serial number for the image-forming device.

An operation panel 22 is user interface means for displaying a user interface for the image-forming device and for receiving input for various instructions from the user. The operation panel 22 is typically equipped with mechanical operation buttons such as a copy start button etc. and a liquid crystal touch-sensitive panel. The liquid crystal panel displays a GUI (Graphical User Interface) screen generated by the control program executed by the CPU 10, detects positions touched by the user on this display and passes these over to the control program. The control program then interprets this user input content from the touch position information.

A communication interface 24 is a device for controlling data communication with a network such as a local area network etc. A print instruction etc. from the remote host is inputted to the image-forming device via the communication interface 24.

A scan engine 26 is a device for supplying a scan function for creating electronic image data by optically reading an original document. An original document placed at an Automatic Document Feeder (omitted from the drawings) is sent to the scan engine one page at a time by the ADF function and is optically read.

The print engine 28 is a device for providing a print function for forming (printing) images on paper using image data provided under the control of the CPU 10.

A token reader 30 is a device for receiving a hardware token held by the user as input and reading data stored within the token. The hardware token is configured from devices compatible with various wired interface standards such as, for example, IC cards or USB (Universal Serial Bus) etc. or devices compatible with various wireless interface standards such as Bluetooth etc.

With this kind of image-forming device, in this embodiment, the security of data saved in the HDD 16 etc. is improved.

Figure 2:
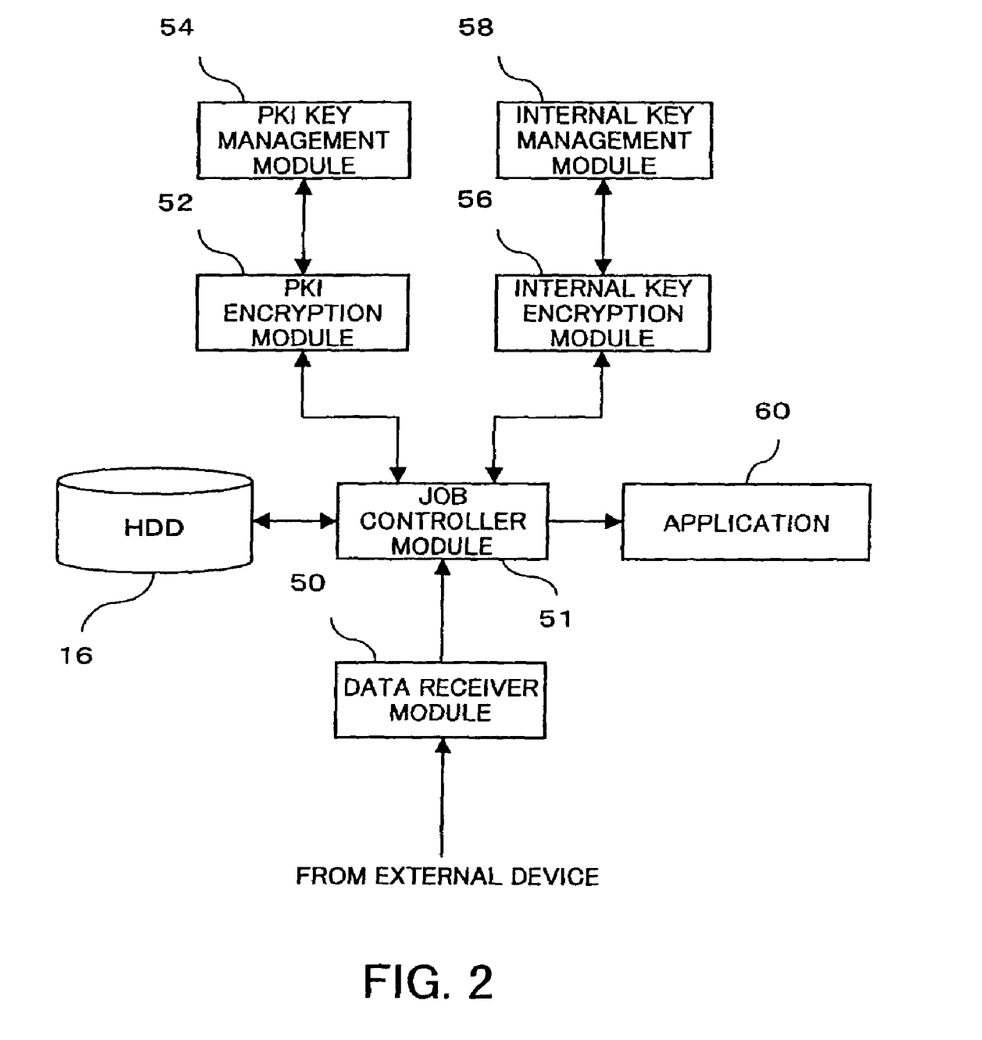
FIG. 2 is a functional block view showing the main essential parts of a control mechanism of the image-forming device.

Next, a description is given of the main essential parts of a control mechanism for this image-forming device with reference to FIG. 2. The control mechanism shown in FIG. 2 is implemented by executing a program stored in the ROM 12, HDD 16 or NVM 18 using the CPU 10.

First, a data receiver module 50 is connected to a data communication network such as a LAN etc., and receives requests from external equipment (PC etc.) on the network. A job request includes instruction data indicating the requested processing content. When the requested job is printing, document data constituting the printing target is included. There are cases where an external device may send instruction data or document data constituting a job after encrypting the data using the corresponding image-forming device public key.

A job controller module 51 exerts control to receive job requests inputted using the user interface screen displayed at the operation panel 22 and to receive job requests received by the functions of the communication interface 24 and the data receiver module 50 and to execute jobs relating to these requests. The job controller module 51 registers an inputted job in a queue, and when the time to execute this job arrives, provides the required data to an application 60 and executes the job. When the received data is encrypted, the job controller module 51 makes a request for decryption to the PKI encryption module 52. When the job to be executed is a job for which the storage of data is necessary, the job controller module 51 executes processing in order to save this data on the HDD 16. Jobs that require storage of job data are security print jobs and jobs where a read image is temporarily stored in a private storage area. A description of security print has already been given.

Further, the job controller module 51 reads out job data saved temporarily at the HDD 16 at the time of use in order to execute a job and provides this job data to the application 60.

The application 60 is a function module for providing each of the functions such as the printing function, scan function, facsimile function etc. provided by the image-forming device for executing jobs.

The PKI encryption module 52 is a function module for encryption and decryption processing for public key encryption methods, and executes processing for the adding and authentication of electronic signatures in accordance with public key infrastructure.

A PKI key management module 54 is a function module for managing key information used in encryption and decryption at the PKI encryption module 52 and in processing for adding and authenticating electronic signatures. The PKI key management module 54 is equipped with a function for reading out private keys and public keys in the image-forming device stored in the HDD 16 or the NVM 18, and public keys for external devices. These keys are registered manually, for example, in the PKI key management module 54 by a system manager. Further, the PKI key management module 54 may also be configured to acquire these keys from a certifying authority as necessary. Public key certificates issued by a certifying authority have an expiration date (period of validity). When the expiration date for the public key/private key of the image-forming device runs out, this cannot practically be used by the PKI system.

An internal key encryption module 56 is a function module for carrying out encryption processing on data stored in the HDD 16 and for carrying out decryption processing on saved encrypted data. The internal key encryption module 56 carries out encryption and decryption processing using an internal key. This internal key differs from public keys and private keys with expiration dates in being valid for an indefinite period and the same internal key is used until changed by the user of the image-forming device. Any encryption algorithm may be used in this encryption and decryption providing that the encryption algorithm is capable of fulfilling requirements with respect to user security. There are cases, depending on the algorithm used, where the same common internal key is used for encryption and decryption, and cases where asymmetrical keys are used, namely, different internal keys are used for encryption and decryption.

An internal key management module 58 is a function module for managing internal key information used in encryption and decryption processing of the internal key encryption module 56.

In a preferred embodiment, the internal key management module 58 automatically generates internal keys based on information specific to this image-forming device. One example is a method of generating internal keys from the device serial number stored in the one-time PROM 20. A key generating program for generating internal keys is stored in the ROM 12. The internal key management module 58 generates internal keys by providing the device serial number as a parameter to the key generating program. The key generating program and the device serial number are both fixed. Therefore, according to this method, it is usually possible to generate internal keys of the same value. It is possible for generation of an internal key to be carried out each time as encryption or decryption becomes necessary but it is preferable to create internal keys at prescribed times for storage in the RAM 14 and re-utilize these internal keys. The time of generation of this internal key is preferably when the image-forming device is activated by turning on the power supply.

Figure 3:
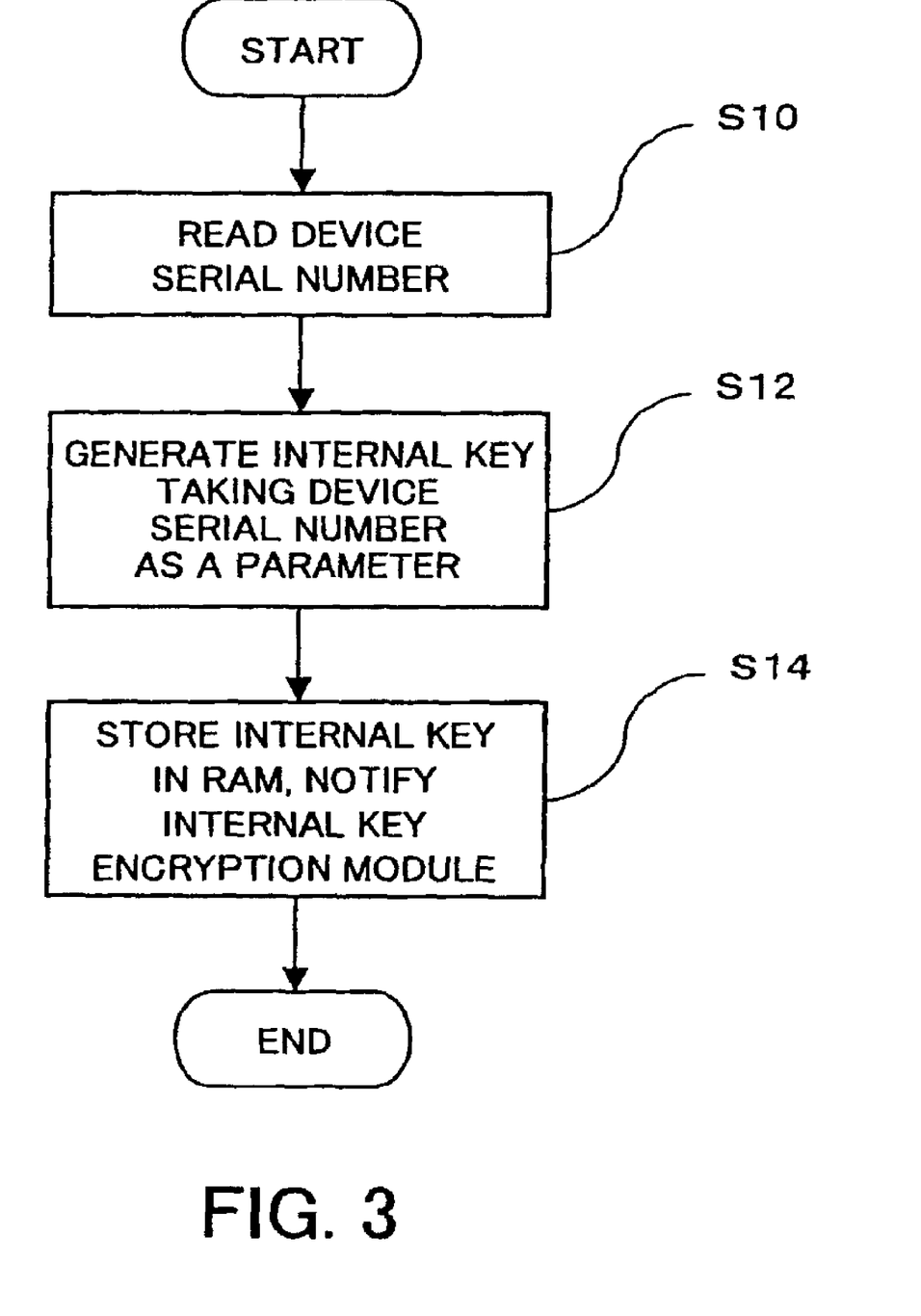
FIG. 3 is a view showing an example of a key creation procedure for an internal key management module.

An example of a procedure for generating an internal key is described using FIG. 3. This process is executed at the time of activation, etc.

In this process, first, the internal key management module 58 reads the device serial number from the one-time PROM 20 (S10). Next, the secret key generating program is executed taking the device serial number as a parameter and a value is calculated for the internal key (S12). The value for the internal key calculated in this way is stored in the RAM 14 and the internal key encryption module 56 is notified of information (for example, internal key address information for the RAM 14) for accessing this internal key (S14). When encryption or decryption is necessary, the internal key encryption module 56 acquires a value for the internal key based on this access information.

In this example, the internal key itself is therefore not stored in non-volatile storage media (HDD 16 or NVM 18 etc.) of the image-forming device and the risk of disclosure of the internal key can therefore be reduced. Even if the device serial number is known, it is not possible for a third party to generate an internal key if the confidentiality of the key generating program is maintained. Moreover, in this example, the generated encryption keys are stored in the volatile RAM 14 and the internal key is therefore deleted when the power to the image generating device is cut off. The security of the internal key is therefore improved.

Figure 4:
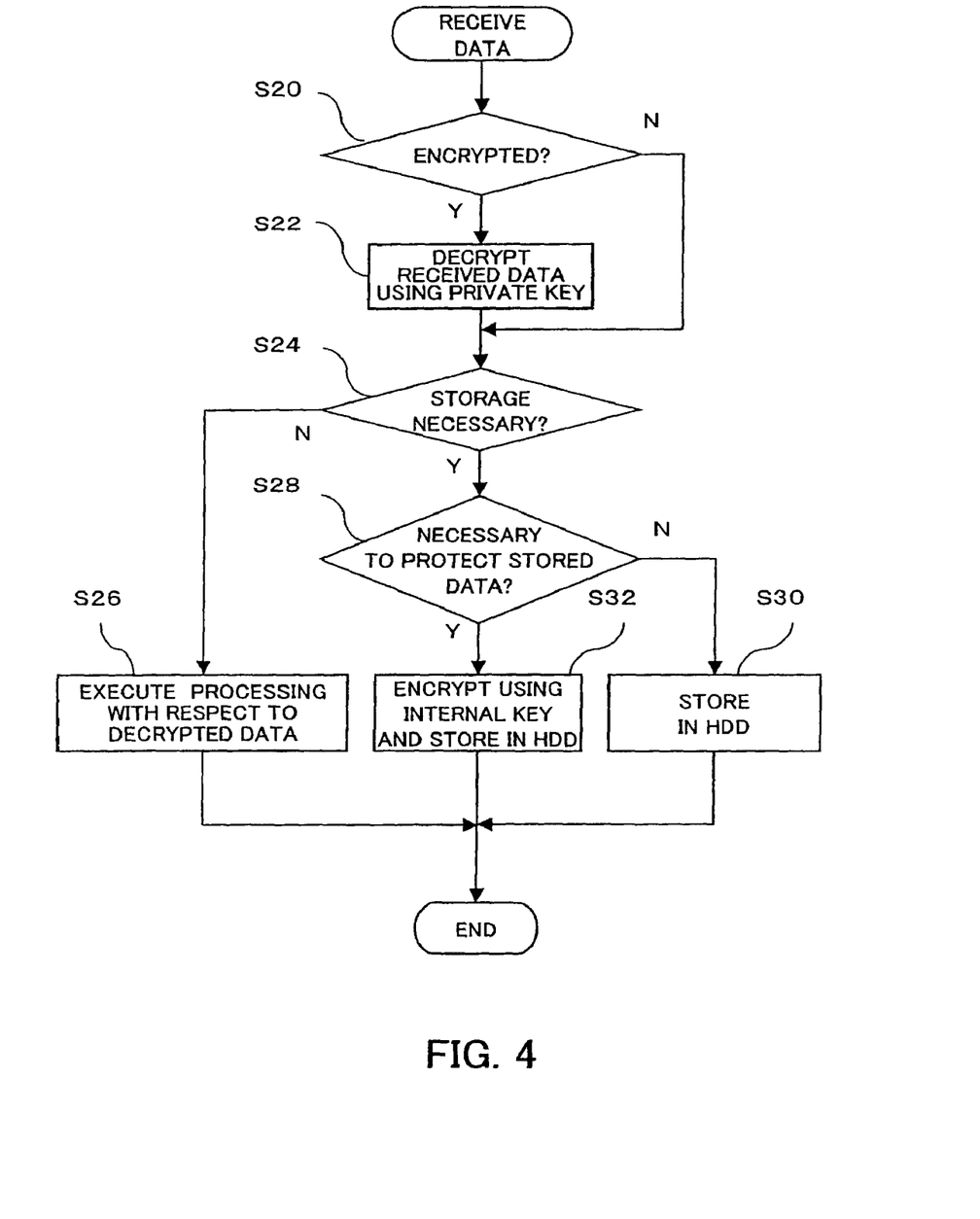
FIG. 4 is a view showing a processing procedure for receiving data.

Next, a description is given with reference to FIG. 4 of processing carried out by the image-forming device when job request data from an external device is received via a network.

In this process, first, the job controller module 51 makes a determination as to whether or not data received by the data receiver module 50 is encrypted (S20). When it is determined that the data is encrypted, the data is decrypted by the PKI encryption module 52. As a result, the PKI encryption module 52 acquires a secret key for the image-forming device from the PKI key management module 54 and decrypts the data using this private key (S22).

Figure 5:
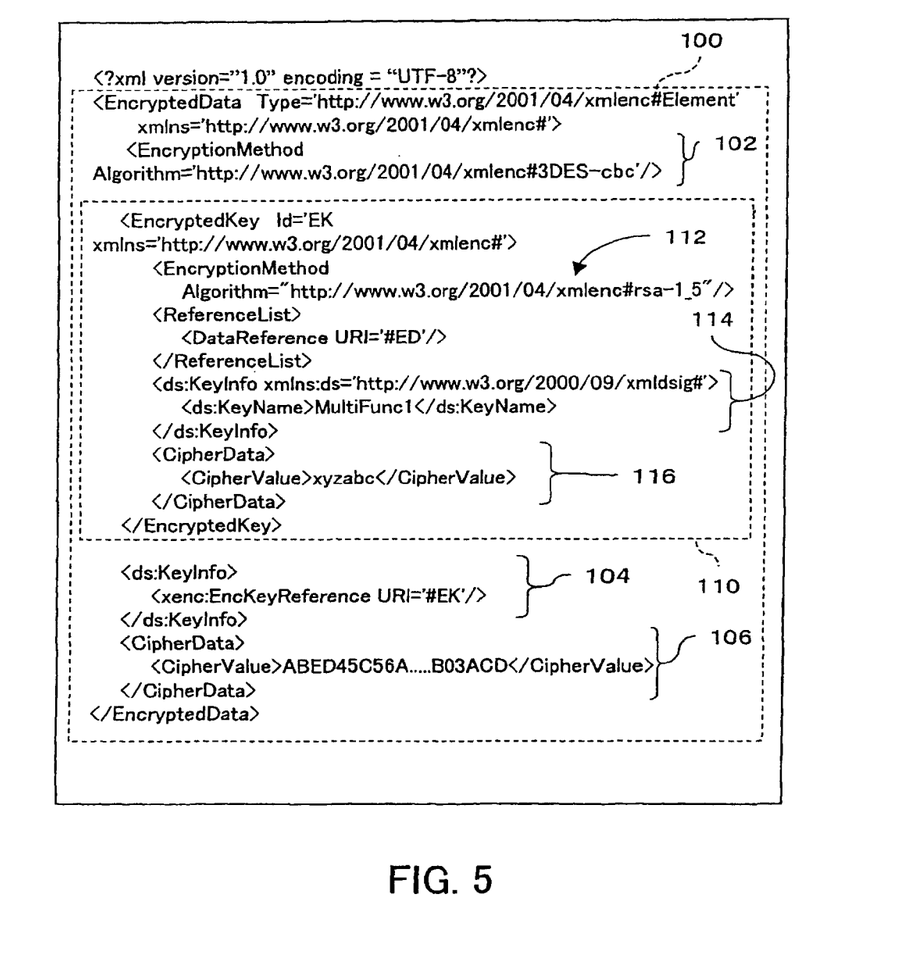
FIG. 5 is a view showing an example of encrypted received data.

An example of this decryption processing is described utilizing the encrypted data shown in FIG. 5.

The encrypted data shown in FIG. 5 is encrypted in accordance with XML encryption of the W3C recommendation. In this example, an element 102 indicating an algorithm used in encryption of the data is described in an encryption data element 100. The element 102 indicates that triple DES is used as the encryption algorithm.

Next, elements 110 and 104 indicating a symmetric key used in this encryption algorithm are described. In this example, a symmetric key used during encryption of the target data is encrypted using a public key of the image-forming device constituting the data transmission destination. This element 110 is an element describing information for this encrypted symmetric key. An element 112 indicating an algorithm used in encryption of the symmetric key, an element 114 indicating a key used in this encryption, and an element 116 indicating the value of the encrypted symmetric key are included in the element 110. The element 114 indicating the encrypted key indicates the name of the image-forming device. This means that a public key corresponding to this name can be used.

The element 104 following after this element 110 includes and reference information indicating use of the key shown in the element 110 as a key for encrypting the data.

An element 106 indicating the value for the data encryption results is then described after elements 110 and 104 indicating the key information.

The PKI encryption module 52 first decrypts the value for the encrypted symmetric key indicated in element 116 using the private key for the image-forming device. Next, the encrypted data value included in the element 106 is decrypted to plain text using the algorithm indicated in element 102 and the symmetric key.

The description now returns again to the processing procedure shown in FIG. 4. The job controller module 51 determines whether or not it is necessary to store the received data (S24). This determination can be carried out based on a job classification indicated in instruction data corresponding to the received data. For example, if classification of the job requested by the external device is job processing such as for a security print that is not executed soon, it is determined that saving is necessary. If the job is a type of job such as a normal print job where the job processing is executed soon, it is determined not to be necessary to save the data. When instruction data from an external device is encrypted, the determination processing in step S24 is executed after decryption of the instruction data.

When it is determined that saving of the data is not necessary in step S24, the job controller module 51 executes processing on data decrypted by the PKI encryption module 52 as soon as possible (S26).

When it is determined that saving of data is necessary, a determination is made as to whether or not data protection is necessary for the data to be saved (S28). This determination can be carried out based on attribute information for this data (or for a job targeting this data). Confidentiality instructed by the requester of the job for this data or storage time etc. may also be given as attributes capable of being used in this determination. The storage time indicates the period for which the requester of the job wishes the data to be stored at the image-forming device. This image-forming device then destroys this data when the storage time from receipt of the data elapses. The expiration date may also be used in place of the storage time. In this example, the user interface for the print driver provided at the external equipment receives authentication information (for example, a pass-phrase) for the security print, confidentiality, and storage time from the user as input. The print driver incorporates each item of information inputted into instruction data and sends this instruction data to the image-forming device.

Figure 6:
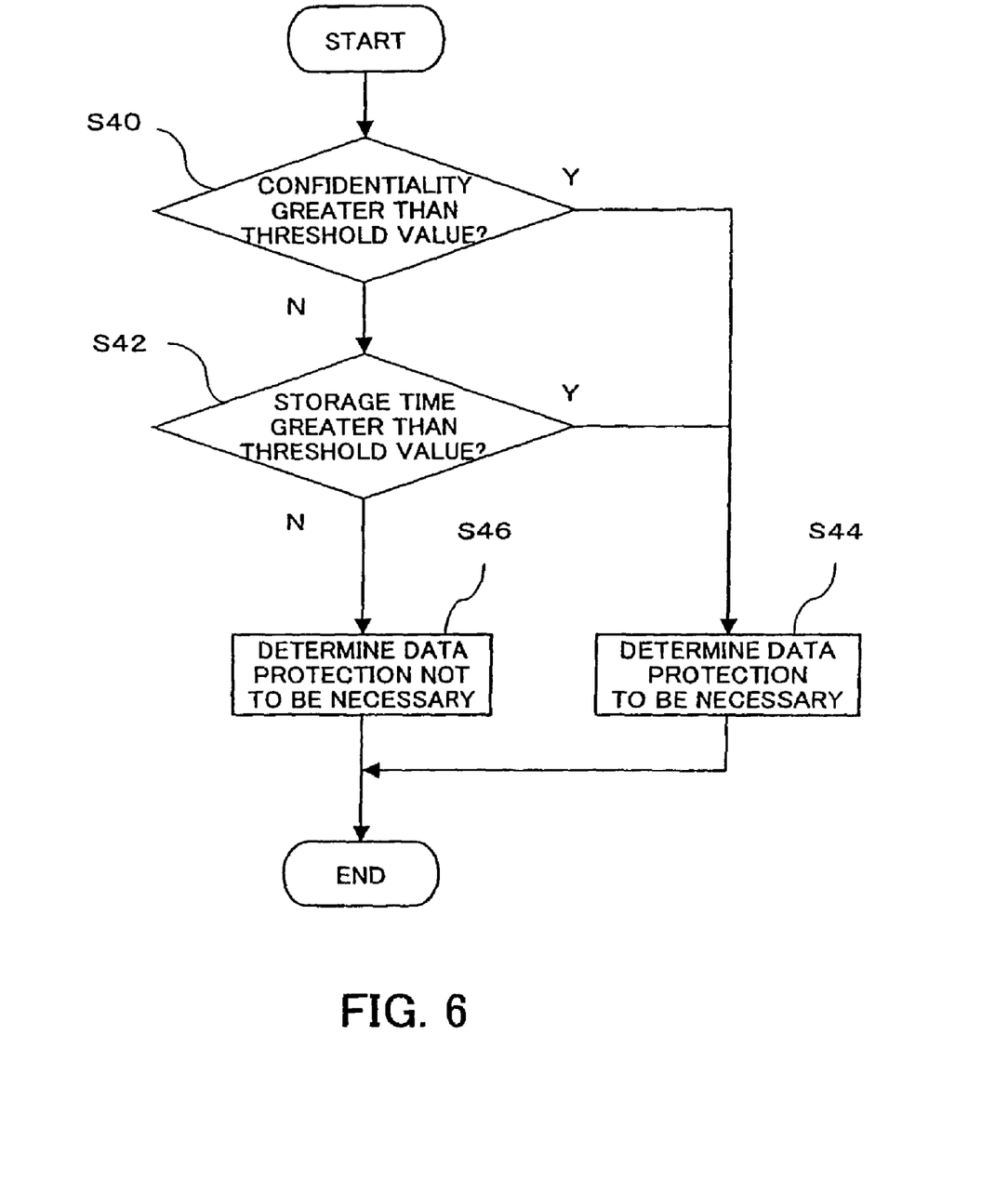
FIG. 6 is a view showing an example of a processing procedure for determining encryption of stored data is necessary.

An example of determination processing occurring in step S28 is shown in FIG. 6. In this example, the job controller module 51 compares confidentiality and storage time indicated in the instruction data for this job to corresponding threshold values (the threshold values are set by a manager of the image-forming device in advance) respectively (S40 and S42). When either one of these values is greater than a threshold value, it is determined that data protection is necessary (S44). On the other hand, if the confidentiality and storage time are both less than or equal to the threshold values, data protection is determined to be not necessary (S46).

In the example in FIG. 6, confidentiality instructed by a user and storage time are used in order to determine the necessity of data protection, but this is merely given as an example. In place of this, for example, it is also possible to determine confidentiality of the data based on key length of the symmetric key (element 116 of FIG. 5) used in encryption of the received encrypted data and to determine whether or not data protection is necessary according to the degree of confidentiality.

In a further example of determination, there is a determination method such that, when the data inputted at the image-forming device is encrypted, the data is determined to need protection at the time of storing. It is assumed that the sender wishes the data to be protected from the fact that data sent to the image-forming device was encrypted, and encryption is therefore carried out accordingly when saving. In this method, when the inputted data is not encrypted, a determination may simply be made such that encryption is not necessary during saving, or another detailed rule for determination can be made.

Further, a determination can also be made as to whether or not data protection is necessary according to the storage device that is the data storage destination. Namely, as described above, in the case of an image-forming device where the HDD 16 is optional, in a configuration where an HDD 16 is not provided, the stored data is stored in the non-volatile memory 18. However, extraction of the HDD 16 from the image-forming device is comparatively easy so that, for example, there is a possibility that, for example, an unauthorized user may extract the HDD 16 overnight, etc. and analyze the contents. However, the non-volatile memory 18 is fixed to the circuit board of the image-forming device and the possibility of the non-volatile memory 18 being extracted and analyzed is therefore low. Whether or not the image-forming device is provided with an optional HDD 16 is recorded in the non-volatile memory 18 as one part of equipment configuration information. A program for determining whether or not data protection is necessary refers to the equipment configuration information to check whether or not the HDD 16 is provided. If the HDD 16 is provided, it is determined that data protection is required for the saved data, and if not provided, it is determined that data protection is not required.

Further, it is also possible for the person requesting the job to designate whether or not protection of data is required for this job. In this case, information for whether or not data protection is necessary is incorporated into the instruction data for the job and is sent to the image-forming device.

Returning again to the description of the processing procedure in FIG. 4, when it is determined in step S28 that data protection is not required for the saved data, the job controller module 51 stores data decryption results of the PKI encryption module 52 in the HDD 16 without encrypting these results (S30). On the other hand, when it is determined in step S28 that data protection is required for the saved data, the job controller module 51 encrypts the data decryption results of the PKI encryption module 52 at the internal key encryption module 56 and stores these encrypted results in HDD 16 (S32).

Regarding the stored data, when the time comes to execute the job process, the job controller module 51 extracts the stored data from the HDD 16 and if this data is encrypted, the data is decrypted by the internal key encryption module 56 and then provided to the application 60.

In the above, a description is given of the processing for storing data received from external equipment via the network. With the image-forming device of this embodiment, not only this received data but also image data created by the scan engine 26 etc. and data generated internally within the image generating device can be encrypted by the internal key encryption module 56 when being saved to the HDD 16.

With the image-forming device of the embodiment described above, public key-encrypted data received from an external device is re-encrypted using an internal key of the device itself after being decrypted once. When the received data itself encrypted using a public key is stored, the management of old secret keys is problematic, but as the internal key is valid for an indefinite period this problem is resolved. Further, in this embodiment, data encrypted using a unified key referred to as an internal key is stored, and the encryption strength of the encrypted data stored in the HDD 16 is therefore uniform. Requests where it is desired to have the encryption strength of data stored within the HDD 16 of a fixed extent or greater are satisfied by appropriately selecting the key length of the key used as the internal key and the encryption algorithm of the internal key encryption module 56.

Further, when a structure is adopted where data encrypted using a public key is stored in the HDD 16 as is, if the stored secret key becomes damaged for whatever reason, there is a danger that this encrypted data cannot be decrypted. However, in this embodiment the internal key is generated from the serial number of the device and then encrypted, and this danger is therefore reduced. In other words, the secret key which is updated every limited period of validity is stored in the HDD 16 or the non-volatile memory 18, read and write operations are comparatively common, and there is a certain risk of damage. However, the risk of damage to the one time PROM 20 in which the serial number is written or to the ROM 12 in which the key generating program is written is comparatively low compared to the HDD 16 or the non-volatile memory 18.

The preferred embodiment described above is merely given as an example and various modifications can be considered while remaining within the spirit of the present invention.

Figure 7:
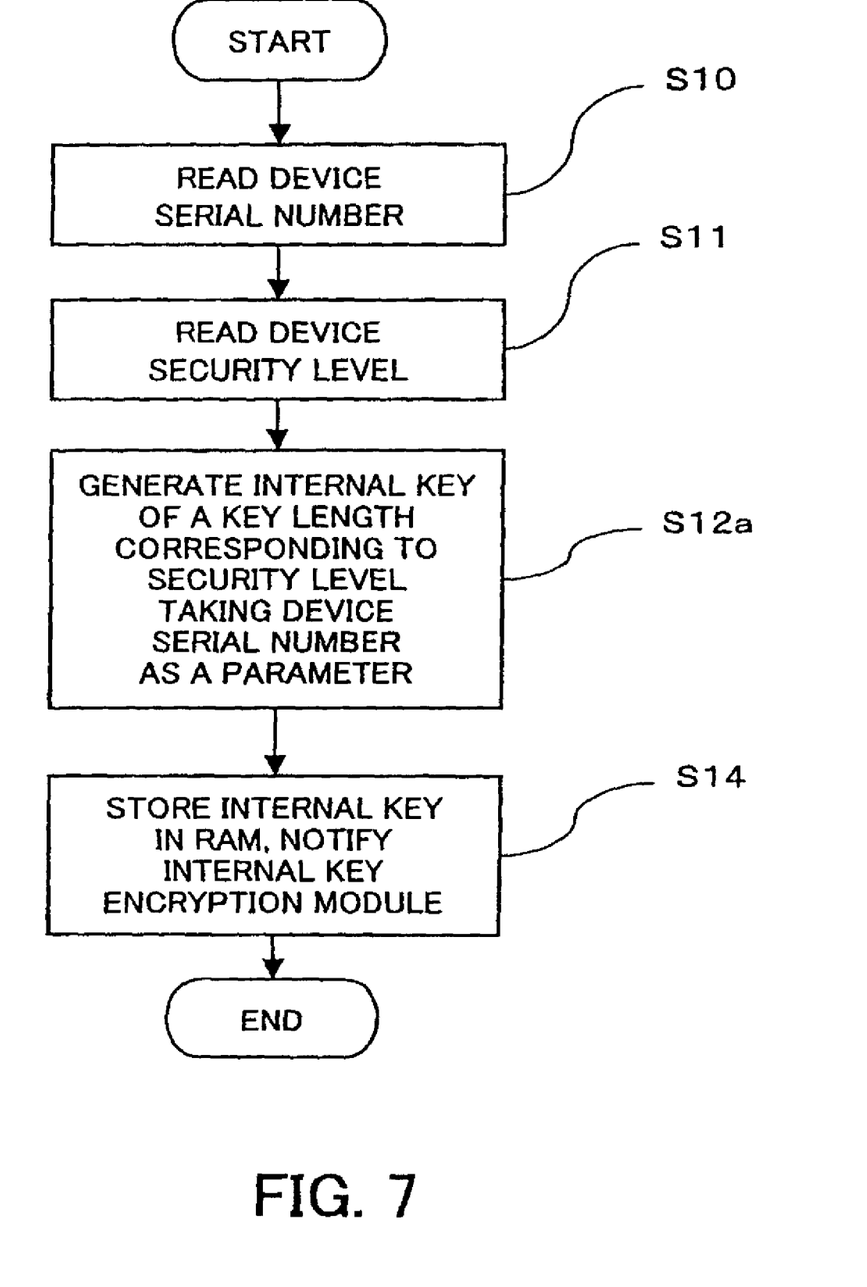
FIG. 7 is a further view showing an example of a key creation procedure for an internal key management module.

For example, the internal key created by the internal key management module 58 may be made to have a degree of encryption strength requested by the user. In this way, the user can set a value for the desired security level for the image-forming device. This setting value can be stored in the HDD 16 or the non-volatile memory 18. The internal key management module 58 then reads this security level setting value (S11) in addition to the device serial number (S10) as shown in FIG. 7 when the system is activated, etc. Key length of the internal key is then decided according to this security level and an internal key of this key length is generated by the key generation algorithm (S12a) and stored in the RAM 14 (S14).

There are also countries where law dictates that there are limits put on key length of encrypted keys and the device of this embodiment is also able to deal with this. For example, by writing identification information indicating the country the device is to be shipped to in the one-time PROM 20 or the non-volatile memory 18 of the image-forming device, the internal key management module 58 can read out the value set for the country being shipped to when generating an internal key and decide key length of the internal key according to this value.

Further, in this embodiment, an internal key is generated from the device serial number but it is also possible to generate the internal key from other information specific to the device stored in a storage device the image-forming device is equipped with.

Moreover, in addition to the device serial number, it is also possible to invoke a hardware token (hereafter abbreviated to "token") and generate an internal key. For instance, in a modified example, in addition to the device serial number, information stored in the token is used as a parameter for generating the internal key. Invoking the token then makes it difficult to illegally create an internal key even when the key generating algorithm of the internal key management module 58 is disclosed.

Figure 8:
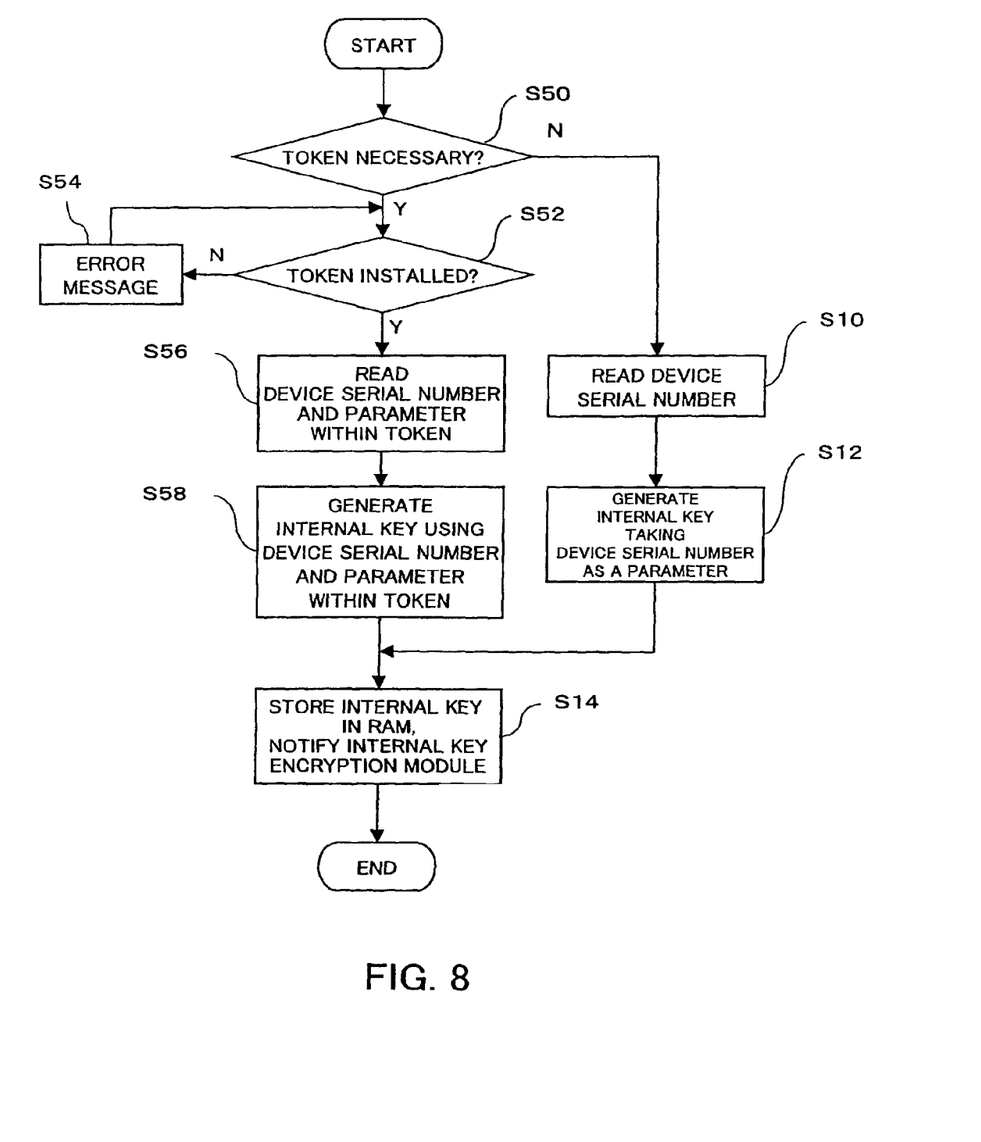
FIG. 8 is a still further view showing an example of a key creation procedure for an internal key management module.

An example of a procedure for a key generating process using this method is shown in FIG. 8. In the case of generating a key, the internal key management module 58 first sets the key generation for the image-forming device and determines whether or not a token is set for use (S50). This setting can be carried out by the manager of the image-forming device and the set value can be stored in HDD 16 or in the non-volatile memory 18. When it is determined that a token is not necessary in this determination, the same process as shown in FIG. 3 is executed (S10, S12, S14). On the other hand, when it is determined that a token is required for key generation, the internal key management module 58 determines whether or not token data is input from the token reader 30 (S52). When there is no input, an error message indicating that a token should be installed in displayed at the display of the operation panel 22 (S54) and installation of the token is invited. When it is determined in step S52 that a token is installed, the internal key management module 58 reads the device serial number and the token data respectively (S56), generates an internal key using the device serial number and token data as parameters (S58), and stores the internal key in the RAM 14 (S14).

A configuration where an internal key is generated only using a parameter within the token and without using the device serial number can also be considered.

Further, rather than generating an internal key within the image-forming device, an internal key can be stored in advance within the token and this can be read out and utilized by the image-forming device.

Moreover, in the above example, a single internal key is used for the image-forming device but it is also possible to create an internal key for each registered user registered in the image-forming device to be used to carry out encryption for each user. In this example, the image-forming device then determines the proprietor of the saved target data from received instruction data or header information for the saved target data etc. and re-encrypts decryption results of the PKI encryption module 52 using the internal key for this proprietor and stores this in the HDD 16.

The above is a description of a preferred embodiment for the case of application of the present invention to an image-forming device such as digital multi-purpose equipment etc. However, as is clear from the above description, the method for protecting stored data in this embodiment does not depend on the type of processing or the type of data to be stored, and application to various job processing devices other than image-forming devices is possible.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims should cover any and all such applications, modifications, and embodiments within the scope of the present invention.

What is claimed is:

1. An information processing device comprising:
at least one processor; and
at least one memory, the memory storing instructions which when executed cause the at least one processor to implement,
an input interface that receives input of encrypted data;
a decryption software module that decrypts encrypted data inputted by the input interface using a decryption key forming a pair with a first encryption key used to encrypt the data;
a key generator that generates a second encryption key different from the first encryption key when power to the information processing device is turned on;
an encryption software module that encrypts data decrypted by the decryption module using the second encryption key;
a storage device that stores data encrypted by the encryption module; and
a controller that receives input of a retention time for data inputted by the input module, and instructs the encryption module to execute the encryption when the received retention time is longer than a preset threshold value,
wherein the second encryption key generated by the key generator is deleted when the power to the information processing device is turned off.

2. A non-transitory computer-readable medium storing a program that, when executed, causes a computer to function as:
- an input interface that receives input of encrypted data;
- a decryption module that decrypts data inputted by the input interface using a decryption key forming a pair with a first encryption key used to encrypt the data;
- a key generator that generates a second encryption key different from the first encryption key when power to the computer is turned on;
- an encryption module that encrypts data decrypted by the decryption module using the second encryption key;
- a storage device that stores data encrypted by the encryption module; and
- a controller that receives input of a retention time for data inputted by the input interface, and instructs the encryption module to execute the encryption when the received retention time is longer than a preset threshold value, wherein
- the second encryption key generated by the key generator is deleted when the power to the computer is turned off.

3. The non-transitory computer-readable medium according to claim 2, wherein
- the program further causes the computer to function as a security level setting module that sets a security level for the computer, and
- the key generator generates, as the second encryption key, an encryption key of a key length corresponding to the security level set at the security level setting module.

* * * * *